April 15, 1958 A. E. SMOLL 2,831,168

COUPLING DEVICE FOR WAVE TRANSMISSION SYSTEMS

Filed Jan. 4, 1954

Inventor:
Allen E. Smoll,
by Charles M. Hutchins
His Attorney.

2,831,168
Patented Apr. 15, 1958

2,831,168

COUPLING DEVICE FOR WAVE TRANSMISSION SYSTEMS

Allen E. Small, Baldwinsville, N. Y., assignor to General Electric Company, a corporation of New York Application January 4, 1954, Serial No. 401,880

7 Claims. (Cl. 333—11)

This invention relates to coupling devices, and more particularly, to such devices for coupling a plurality of wave transmission circuits.

In many high-frequency circuit applications it is desirable to couple a plurality of input and output circuits in such a manner that power can be transmitted from each input circuit into the output circuits without any power being transmitted into other input circuits. In other words, each input circuit is to be isolated from the other input circuits. Devices for so coupling wave-transmission circuits are well known in the art as microwave hybrids. One of the common types of hybrids is the hybrid circle or "rat-race," and the present invention relates to a hybrid of this type.

Hybrid circles are effective in coupling two output circuits and two input circuits together in such a manner that power can be transmitted from either input circuit to both output circuits with the other input circuit receiving no power. In many applications it is desirable that the hybrid circle be capable of performing well over a relatively wide frequency band. However present hybrid circles are inherently narrow bandwidth devices. This is due to their construction, which includes sections of wave transmission medium, such as a coaxial cable or a wave guide, having lengths that bear a definite relationship to the wave length being transmitted for achieving isolation.

Accordingly, it is a principal object of the present invention to provide an improved hybrid circle that provides coupling between input and output arms and isolation between input arms but which is not limited to a narrow bandwidth.

It is another object of the present invention to provide a new and improved transmission line element having a physical length of approximately ¼ wavelength while having a phase shift equivalent to that of an approximately ¾ wavelength element.

The objects of the present invention may be realized through the provision of means for reversing the phase of a portion of the input wave as it travels between input arms.

The features of this invention which are believed to be novel are set forth with particularity in the appended claims. The invention itself, however, both as to its organization and method of operation, together with further objects and advantages thereof, may best be understood by reference to the following description when taken in connection with the accompanying drawing wherein:

Figure 1:
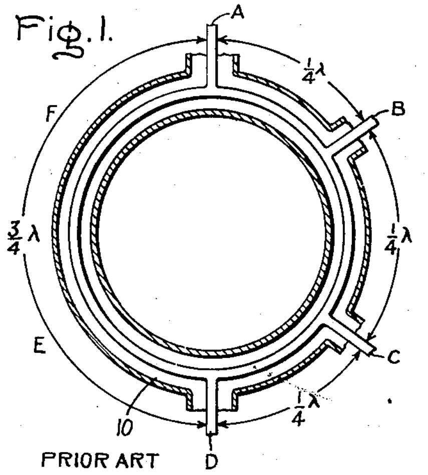
Fig. 1 is a diagrammatic circuit arrangement of a prior art device which is useful in explaining the present invention.

To facilitate an understanding of the present invention, a general description of hybrid circles follows with reference to Fig. 1, which illustrates a common form of microwave hybrid. As is well known, a conventional hybrid circle includes a closed ring or loop of a high-frequency wave transmission medium, here shown as a coaxial cable 10, which is one and one-half wavelengths in mean circumference. Four arms A, B, C, and D are spaced at quarterwave intervals around one-half of the perimeter of the loop 10. Either arms B and D or arms A and C can be used as input arms. However, for the purpose of the present description, it is assumed that arms A and C are the input arms and arms B and D are output arms. Energy coupled into the ring 10 from arm A splits into two in-phase waves and the resulting two waves travel around the ring in opposite directions for three-quarters of a wavelength to the diametrically opposite point on the ring which is output arm D. At this point the resulting waves are still in-phase and, if zero losses are assumed, a pure standing wave is set up in the ring. Hence at point D, where there is total constructive interference, there is a voltage maximum established. The remaining minima and maxima occur at one-quarter wavelength intervals around the ring. Input energy at C also establishes a standing wave by the same mechanism with voltage maxima occurring at D, and B and minima at A. When energy is coupled into the ring at A, arm C receives no power because it is coupled into the ring 10 at a voltage minimum. Arms B and D each receive one-half of the wave power because they are located at points of voltage maxima, arm D receiving the portion of the wave traveling past points E and F and arm B receiving the wave directly from arm A. Since equal amounts of power are drawn by arms B and D, the A input wave is not adversely affected in the region B—C—D. Similarly, the C input standing wave is not affected in the region DFEAB because equal amounts of power pass D and B towards A. Cross-coupling between the input arms A and C is small because each is located at a voltage minimum and so ideally draws no power. Therefore, the essential hybrid characteristic of isolation of input arms is maintained.

However, the hybrid circle depicted in Fig. 1 is extremely frequency sensitive in regard to the isolation of the input arms because it is necessary for the halves of the input wave from arm A to travel different geometrical path lengths in arriving at input arm C in order to arrive out of phase. That is, the actual geometrical traveled-path length, of the wave traveling the path ABC is one-half a wave length while the actual geometrical traveled-path length of the wave traveling the path AEFDC is one wave length. If any other frequency were transmitted there would be cross-coupling at input arm C because the waves arriving at arm C are no longer out-of-phase and hence there would not be a voltage minimum at this point.

Figure 2:
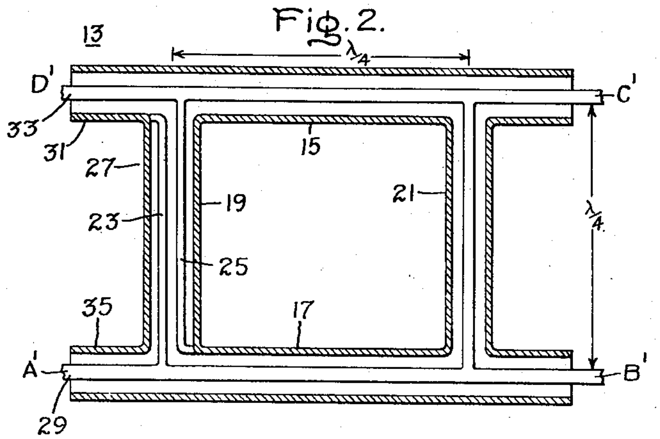
Fig. 2 is a diagrammatic wiring diagram of a hybrid circle embodying the present invention.

A hybrid circle embodying the present invention for overcoming frequency sensitivity is shown in Fig. 2. A closed loop or ring 13 includes four connecting sections 15, 17, 19, and 21 of equal lengths. Terminal arms A′, B′, C′, and D′ are connected into the loop 13. Arms A′ and C′ are designated input arms and arms B′ and D′ are designated output arms for the purposes of this description. Manifestly however, the designations are interchangeable and either pair of arms can be used for input or output arms.

In accordance with the present invention, the connecting arm 19 between input arm A′ and output arm D′ is a phase reversing section, that is, an output wave is reversed in phase from an input wave. The phase reversing section 19 in its simplest embodiment, as illustrated in Fig. 2 is a twin-conductor line including parallel conductors 23 and 25. The conductor 23 is connected from an inner conductor 29 in the arm A′ to an outer conductor 31 of the arm D′. The conductor 25 is connected from an inner conductor 33 of arm D′ to an outer conductor 35 of arm A′. Thus, the phase of a wave traveling from arm A′ to arm D′ is reversed by the section 19. Preferably, an outer conductor 27 having a length equal to one-quarter the wavelength being transmitted is connected between the outer conductor 31 of the arm D′ and the outer conductor 35 of arm A′. The conductor 27 and the conductor 23 form a shorted quarter wave stub for a wave input to arm A′. This quarter-wave stub broadens the bandwidth at which the impedance of the loop 13 is matched to the impedance of the input circuit connected to arm A′.

Arm A′ is coupled to arm B′ by connecting section 17; arm B′ is coupled to arm C′ by connecting section 21, and arm C′ is coupled to arm D′ by connecting section 15. Hence, an input signal to arm A′ splits into two waves of equal magnitude. A first wave travels to arm C′ through the phase-reversal connecting section 19 and connecting section 15. A second wave travels from arm A′ to arm C′ through connecting section 17 and connecting section 21. Arms 19 and 21 are preferably of the same length as are arms 15 and 17, respectively. Therefore, since the two waves travel the same length path, and since the wave traveling the path A′D′C′ is reversed in phase by section 19, the waves cancel at output arm C′ and no power is absorbed by arm C′. Arms A′ and C′ are thus isolated from each other and a signal input at either arm A′ or C′ is not coupled into the other arm. The isolation between arms A′ and C′ is independent of the lengths of the two paths, and as long as the effective path lengths A′D′C′ and A′B′C′ are equal, cross-coupling between arms A′ and C′ is prevented.

Power from arm A′ reaches output arm D′ through two paths: a first path through connecting section 19 and a second path through connecting sections 17, 21 and 15. Likewise, power from arm A′ reaches output arm B′ through two paths, a first path through connecting section 17, and a second path through connecting sections 19, 15, and 21. Because the two path lengths between arm A′ and each output arm are different, the 180° phase reversal in arm 19 does not necessarily cause the waves arriving at each arm to be out of phase. However, for maximum power transfer from an input arm to an output arm, the waves to each output arm should arrive in phase. Thus, because of the 180° phase reversal, the path lengths for each half of the input wave arriving at each output arm should differ by one-half a wave length.

Therefore, for power-transfer reasons, each of the arms 15, 17, 19 and 21 are shown one-quarter wave length long. However, since isolation of the two input arms is independent of frequency, a wide bandwidth can be transferred without cross-coupling, the only effect being, that at frequencies for which the connecting arms 15, 17, 19, and 21 are not quarter-wave lengths, there is not a maximum power transfer.

Figure 3:
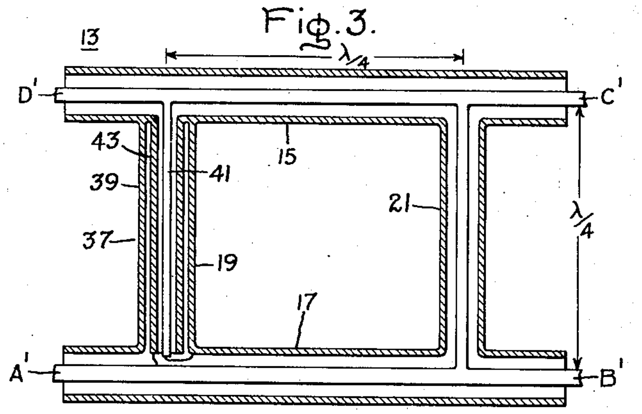
Fig. 3 is a diagrammatic wiring diagram of a modified form of the invention shown in Fig. 2.

Fig. 3 illustrates another embodiment of the present invention. A phase-reversing section 37 is connnected between input arms A′ and D′ to reverse the phase of a wave traveling between arms A′ and D′. In other respects the embodiment illustrated in Fig. 3 is similar to the embodiment shown in Fig. 1 and the same reference characters identify like components in both figures.

In the embodiment of Fig. 3, the phase-reversing section 37 includes an outer conductor 39, an inner conductor 41, and an intermediate conductor 43. The length of the section 43 is preferably approximately one-quarter wave length of the center frequency being transmitted. The intermediate conductor is connected between the inner conductor 29 of arm A′ and the outer conductor 31 of arm D′. The outer conductor 39 is connected between the outer conductor 35 of the arm A′ and the outer conductor 31 of the arm D′. These two conductors are preferably one-quarter of the wave length of the wave being transmitted. However, inner conductor 41 is connected between the outer conductor 35 of the arm A′ and the inner conductor 33 of the arm D′. The wave from arm A′ can travel to arm D′ over this path, but the phase will be reversed. Thus a short-circuit stub formed by outer conductor 39 and intermediate conductor 43 is shunted across the input A′ and serves as an impedance match stub. Therefore, the frequency response is less peaked because of the compensating action of the shorting section.

Figure 4:
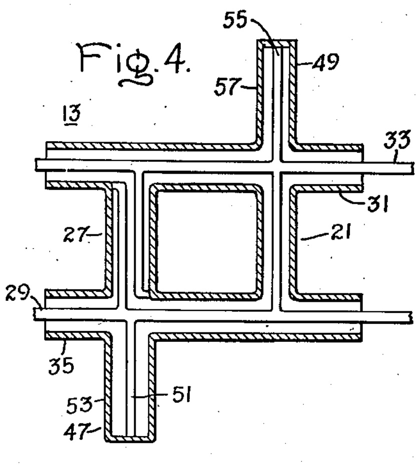
Fig. 4 is a diagrammatic wiring diagram of still another modification of the present invention.

Fig. 4 illustrates still another embodiment of the present invention. Impedance-matching quarter-wave stubs 47 and 49 are connected opposite coupling lines 27 and 21, respectively. In other respects, the ring is the same as that of Fig. 2. As illustrated, the stub 47 includes an inner conductor 51 and an outer conductor 53. Stub 49 includes an inner conductor 55 and an outer conductor 57. If desired, the stubs 47 and 49 may be waveguides, or other transmission media, instead of coaxial conductors, as shown. Inner conductor 51 of stub 47 is connected to the inner conductor 29, and outer conductor 53 of stub 47 is connected to outer conductor 35. Outer conductor 57 of the stub 49 is connected to the outer conductor 31, and inner conductor 55 of the stub 49 is connected to inner conductor 33.

The stubs 47 and 49 in Fig. 4 provide an impedance match for the input waves to the device 13 because they reflect a reactance of opposite type from the transmission sections. Hence, again there is an impedance match at a wider frequency band than would otherwise be the case. This wide-band impedance match enables greater power transfer for a given frequency deviation from the design frequency.

While certain specific embodiments of the invention have been shown and described, it will of course be understood that various other modifications may yet be devised by those skilled in the art which will embody the principles of the invention and fall within the true spirit and scope thereof.

What is claimed is:

1. A coupling device to enable the transmission of wave energy from first and second input circuits to first and second output circuits and to prevent the transmission of wave energy between said first and second input circuits, said device comprising first and second transmission lines each having inner and outer conductors, a phase-reversing quarter-wave coupling line having an outer conductor and two inner conductors, said outer conductor of said coupling line being connected between the outer conductor of said first transmission line and the outer conductor of said second transmission line, one of said inner conductors being connected between the outer conductor of said first transmission line and the inner conductor of said second transmission line, the other of said inner conductors of said coupling line being connected between the inner conductor of said first transmission line and the outer conductor of said second transmission line, a second coupling line having a length equal to one-quarter the wave length of the frequency being transmitted, said second coupling line being connected between said first and second transmission lines and spaced from said phase-reversing coupling line a quarter-wave length along each of said first and second transmission lines.

2. A coupling device to enable the transmission of wave energy from first and second input circuits to first and second output circuits and to prevent the transmission of wave energy between said first and second input circuits, said device comprising first and second transmission lines each having input and output terminals, each of said transmission lines having inner and outer conductors, an impedance matching coupling line having a length equal to one-quarter the wave length of the frequency being transmitted, said impedance matching coupling line including an outer conductor, an intermediate conductor, and an inner conductor, said outer conductor of said coupling line being connected between the outer conductor of said first transmission line and the outer conductor of said second transmission line, said intermediate conductor of said first coupling line being connected between the outer conductor of said first transmission line and the inner conductor of said second transmission line, said inner conductor of said first coupling line being connected between said inner conductor of said first transmission line and said outer conductor of said second transmission line, a second coupling line having a length equal to one-quarter the wave length being transmitted connected between said first and said second transmission lines and spaced a quarter-wave length from said first coupling line, said second coupling line having an inner conductor connected between the inner conductors of said first and second transmission lines and an outer conductor connected between said outer conductors of said first and second transmission lines.

3. A coupling device to enable the transmission of wave energy from first and second input circuits to first and second output circuits and to prevent the transmission of wave energy between said first and second input circuits, said coupling device comprising a quarter-wave phase-reversing coupling line connected between said first and second transmission lines to effectuate a phase-reversal in the wave energy traveling therethrough, a second quarter-wave coupling line connected between said first and second transmission lines and spaced a quarter-wave length from said phase-reversing quarter-wave coupling line so that the distance along said first and second transmission lines between said phase-reversing quarter-wave coupling line and said quarter-wave coupling line is a quarter-wave length, a quarter-wave impedance matching stub connected to said first transmission line at the junction of said first transmission line and said phase-reversing quarter-wave stub, and a second quarter-wave impedance matching stub connected to said second transmission line at the junction of said second transmission line and said quarter-wave coupling line.

4. A coupling device to enable the transmission of wave energy from first and second input circuits to first and second output circuits and to prevent the transmission of wave energy between said first and second input circuits, said coupling device comprising first and second transmission lines each having inner and outer conductors, a phase-reversing quarter-wave coupling line having an outer conductor and two inner conductors, said outer conductor of said coupling line being connected between the outer conductor of said first transmission line and outer conductor of said second transmission line, one of said inner conductors being connected between the outer conductor of said first transmission line and the inner conductor of said second transmission line, the other of said inner conductors being connected between the inner conductor of said first transmission line and the outer conductor of said second transmission line, an impedance matching quarter-wave stub having inner and outer conductors connected together at one end thereof, the other end of said inner conductor being connected to the junction of said inner conductor of said first transmission line and the other of said inner conductors of said coupling line, the other end of said outer conductor of said impedance matching stub being connected to the outer conductor of said first transmission line, a second coupling line having a length equal to the one-quarter the wave length of the frequency being transmitted, said second coupling line being connected between said first and second transmission lines and spaced from said phase-reversing coupling line a quarter-wave length along each of said first and second transmission lines, and a second quarter-wave impedance matching stub connected to said second transmission line at the intersection of said second transmission line and said second coupling line.

5. A coupling device to enable the transmission of wave energy from first and second input circuits to first and second output circuits and to prevent the transmission of wave energy between said first and second input circuits, said device comprising first and second transmission lines each having inner and outer conductors, a phase reversing coupling line having an outer conductor and two inner conductors, said outer conductor of said coupling line being connected between the outer conductor of said first transmission line and the outer conductor of said second transmission line, one of said inner conductors being connected between the outer conductor of said first transmission line and the inner conductor of said second transmission line, the other of said inner conductors of said coupling line being connected between the inner conductor of said first transmission line and the outer conductor of said second transmission line, and a second coupling line heaving inner and outer conductors cross connected respectively to the inner and outer conductors of said transmission lines at regions spaced from the connections to said phase reversing coupling.

6. A phase reversing combination comprising, a first transmission line having an inner conductor and embracing outer conductor, a second transmission line having an inner conductor and embracing outer conductor, a third transmission line having first and second inner conductors and an embracing outer conductor, means connecting said first inner conductor of said third transmission line between the inner conductor of said first transmission line and the outer conductor of said second transmission line, means connecting said second inner conductor of said third transmission line between the outer conductor of said first transmission line and the inner conductor of said second transmission line, and means connecting the outer conductors of said third transmission line between the outer conductors of said first and second transmission lines.

7. A phase reversing network adapted for operation in a predetermined range of wave frequencies comprising, a first transmission line having an inner conductor and embracing outer conductor, a second transmission line having an inner conductor and embracing outer conductor, a third transmission line having an electrical length corresponding to substantially one quarter wave length at a frequency near the mean of said frequency range and having first and second inner conductors and an embracing outer conductor, means connecting said first inner conductor of said third transmission line between the inner conductor of said first transmission line and the outer conductor of said second transmission line, means connecting said second inner conductor of said third transmission line between the outer conductor of said first transmission line and the inner conductor of said second transmission line, and means connecting the outer conductor of said third transmission line between the outer conductors of said first and second transmission lines.

References Cited in the file of this patent

UNITED STATES PATENTS

| | | |
|---|---|---|
| 2,436,828 | Ring | Mar. 2, 1948 |
| 2,666,132 | Barrow | Jan. 12, 1954 |
| 2,724,806 | Tillotson | Nov. 22, 1955 |